Patented Aug. 10, 1954

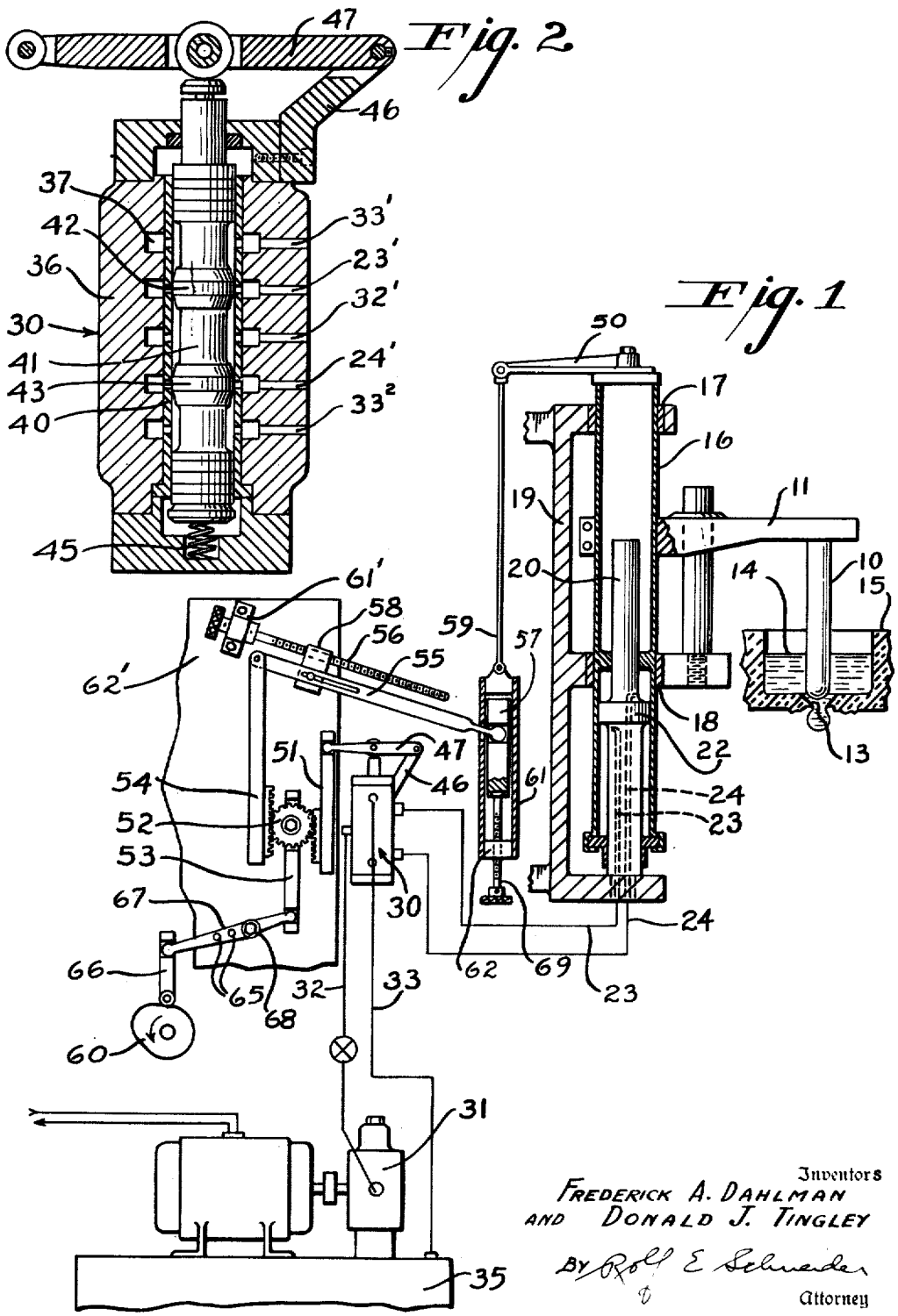

2,685,765

UNITED STATES PATENT OFFICE 2,685,765

GLASS FEEDER PLUNGER-OPERATING MECHANISM

Frederick A. Dahlman and Donald J. Tingley, Corning, N. Y., assignors to Corning Glass Works, Corning, N. Y., a corporation of New York Application May 23, 1951, Serial No. 227,782

5 Claims. (Cl. 49—55)

1

The present invention relates in general to mechanisms for operating a reciprocable part or member, and is more particularly concerned with an improved fluid-actuated mechanism for reciprocating a plunger designed for feeding molten glass in gobs through an outlet in a container for the same.

The conventional operating mechanism for glass feeder plungers is wholly mechanical and includes a rotatable cam designed to lift the plunger mechanically and then permit lowering of the plunger by gravity. The plunger and its associated elements must be of sufficient weight to assure that, under usual operating conditions, the downward movement of the plunger is dictated by the cam outline. When exceptionally viscous glass is to be issued in large gobs, the desired downward movement of the plunger may be assured by the addition of a suitable weight to the plunger; but of course such added weight places a further burden on the plunger-operating mechanism. For dependable operation moreover such mechanism including particularly its operating cam must be ruggedly built, and accordingly changing of cams as required for different feeding conditions tends to be quite difficult. In addition the facilities necessary for adjustment of the plunger stroke and the position of the plunger with respect to the outlet are quite intricate in such a mechanism and must also be ruggedly built.

The use of fluid-actuated devices for the operation of glass feeder plungers has been previously suggested, and several mechanisms involving a fluid-actuated device have been proposed heretofore. So far as we are aware, however, none of such mechanisms has been used commercially. Moreover, none of such mechanisms was designed to impart a choice of movement to the plunger characteristic of selected cam contours.

The principal object of the present invention accordingly is to provide a fluid-actuated mechanism which is adapted to operate a glass feeder plunger in the fashion dictated by a cam, but which substantially eliminates the objectionable features of a mechanism wherein the plunger is actually operated by the cam.

Another object of the invention is to provide a glass feeder plunger-operating mechanism wherein a driving force is always applied to move the plunger in the desired fashion regardless of the viscosity of the glass, the type of gob to be formed, the direction of movement of the plunger, and other operating conditions.

A further object of the invention is to provide a glass feeder plunger-operating mechanism

2 wherein operation of the plunger is controlled by equipment which is operable by a small fraction of the force that would normally be required to operate the plunger directly but which nevertheless determines the characteristic manner of operation of the plunger.

Still another object is to provide an improved form of fluid-actuated glass feeder plunger-operating mechanism.

Other objects and advantages of the invention will hereinafter be pointed out or will become apparent from the following description of a practical form of embodiment of the invention as shown in the accompanying drawing, in which:

Fig. 1 is a view, partly in section, diagrammatically illustrating a fluid-actuated mechanism embodying the present invention and associated with a reciprocable glass feeder plunger arranged over an outlet in the bottom of a glass feeder bowl.

Fig. 2 is a sectional view of a tracer valve under whose control operating fluid is supplied to the plunger-operating mechanism of Fig. 1.

In the form of embodiment illustrated, a glass feeder plunger 10 is supported on a carrier 11 adapted to vertically reciprocate the plunger relative to an outlet 13 in a feeder bowl 15 so as to control the feeding of molten glass from the supply body 14 in the form of successive mold charges or gobs, which may be successively severed from the supply body in known manner.

As shown in Fig. 1 the plunger carrier 11 is attached to a vertical cylinder 16 reciprocable in suitable bearings 17 and 18 in a fixed frame 19. Cylinder 16 comprises the work-performing portion of a fluid-actuated unit which includes a rod 20 secured at its lower end to frame 19 and occupying cylinder 16 in part. Rod 20 intermediate its end and within cylinder 16 is provided with a piston 22 to either side of which operating fluid is supplied via suitable passages 23 and 24. In order to provide the necessary pressure differential to effect the desired counterbalance, the exposed upper surface of piston 22 is made greater than the exposed under surface thereof. Operating fluid passages 23 and 24 extend to the cylinder ports 23' and 24' (Fig. 2) of a slide or tracer valve 30 which has a pressure port 32' connected with a pressure fluid supply pump 31 by a conduit 32. Valve 30 is provided with return ports 33' and 33² connected by a conduit 33 with a fluid reservoir 35.

Tracer valve 30 comprises a cylindrical housing 36 having annular passages, such as 37, in individual communication with the respective valve ports 23', 24', 32', 33' and 33² via suitable apertures in a wear-resistant sleeve 40 occupying such housing. A slide or spool 41 occupies sleeve 40 and is provided with valving elements 42 and 43 adapted to variably restrict the passage of fluid from the pressure port 32′ to either cylinder port 23′ or 24′ and to in a like fashion exercise control over the return of fluid from the latter ports to return ports 33′ and 33². A spring 45 tends to move spool 41 to one of two extreme endwise positions within sleeve 40. The normal position of spool 41, however, is substantially as shown in Fig. 2. Pivotally mounted at one end in a bracket 46 on valve 30 is an arm 47 adapted to move the spool 41 against the tension of spring 45 through a linkage extending to the cylinder 16. Arm 47 is also adapted to so move spool 41 through an associated linkage operable by a cam 60. As shown, the free end of arm 47 is pivotally connected to one end of a rack 51 adapted for endwise movement by rotation of a meshing pinion 52 carried on a bar 53 adapted for endwise movement parallel to rack 51. Pinion 52 also meshes with rack 54, which is also movable endwise in a path substantially parallel to that of rack 51. Pivoted at one end at the top of rack 54 is a lever 55, which intermediate its ends is pivoted to a block 58 adjustable along the length of lever 55 by a screw 56 rotatable in a bearing 61′ carried by a suitable support 62′. Lever 55 at its other end is attached to a slide 57 adjustable lengthwise within a sleeve 61 at one end attached to one end of a rod 59 whose other end is pivotally attached to an arm 50 extending laterally from the top of cylinder 16. The other end of sleeve 61 is provided with a plug 62 through which is threaded an adjusting screw 69 suitably coupled to slide 57.

To effect a movement of the tracer valve spool 41 by cam 60, a push rod 66 is associated with such cam. Push rod 66 is coupled to one end of a lever 67 which is pivoted intermediate its ends at 68 and at its other end is coupled to bar 53. Endwise movement of bar 53 upon actuation by cam 60 effects rotation of the pinion 52 over rack 54, which initially remains substantially stationary, and thereby effects an endwise movement of rack 51 and a consequent change in the position of the tracer valve spool 41.

The outline of cam 60 governs the rate of speed and the extent of movement of the spool 41, which in turn regulates the flow of fluid to the respective ends of cylinder 16 and from the ends of such cylinder in a manner to move the cylinder in a direction and at a rate of speed in accordance with the cam contour. The cylinder 16 during such movement, by means of its linkage with the tracer valve, moves the spool 41 in the reverse direction to that in which it is being moved by the cam 60 and at such rate that the spool is again in its normal position and the original counterbalance is reestablished substantially immediately following discontinuance of movement of the spool by cam 60.

By means of the screw 69 the effective length of rod 59 can be adjusted to provide any desired change in the height relative to outlet 13 to which plunger 10 needs to be raised to meet variations in operating requirements. By means of the adjusting screw 56, the intermediate pivot point of lever 55 can be shifted to vary the extent of movement of spool 41 relative to that of cylinder 16 upon movement of such cylinder, to further meet varied operating requirements. Additionally lever 67 is provided with apertures 65 to which its pivot 68 may be readily transferred.

From the foregoing description of the various parts of the particular structural embodiment of the invention shown in the drawing, it will be obvious that the operating characteristics of the plunger are dictated by the outline of the cam used and that, accordingly, by selection of the proper cam and suitable adjustment of screws 56 and/or 69 and/or by changing the pivot point 68, any of a practically unlimited variety of plunger-operating characteristics can be obtained. Obviously, the plunger-height and plunger-stroke adjustment features are employed to make the operation of the plunger compatible with the gob characteristics it is expected to produce with any particular cam.

The present invention, moreover, enables gob formation to be readily accomplished and maintained with an unusually high degree of accuracy, a feature of particular importance where an exceptionally heavy gob is required or the molten glass is being fed at a relatively high viscosity. The desired shape of the gob can also be controlled within a very narrow tolerance with the result that a wider range of shapes can be satisfactorily pressed and the selection of commercially suitable ware can be materially improved.

We claim:

1. A glass-feeding apparatus for use with a molten glass supply container having a bottom outlet, comprising a vertically reciprocable plunger arranged over said outlet, a support for said plunger comprising the movable element of a fluid-operated unit adapted to move said plunger relative to said outlet, a tracer valve having operating-fluid passages in communication with the opposite ends of said unit and having a slide, a cam operative to effect variable movement of said slide and having a contour in accordance with the character of variable movement to be imparted to said slide, and means operable by the movable element of the fluid-operated unit to move the slide in a direction opposite to the movement imparted thereto by the cam.

2. Apparatus according to claim 1, in which the fluid-operated unit comprises a vertically arranged cylinder adapted for reciprocation with respect to a piston contained therewithin and mounted on a rod fixedly positioned with respect to the tracer valve.

3. Apparatus according to claim 2, in which the upper surface area of the piston is greater than its lower surface area.

4. Apparatus according to claim 1, in which the means operable by the movable element of the fluid-operated unit comprises a mechanical linkage.

5. Apparatus according to claim 4 in which the mechanical linkage includes a lever pivoted intermediate its ends and a rod adjustably connecting one end of said lever with the movable element of the fluid-operated unit.

References Cited in the file of this patent

UNITED STATES PATENTS

| Number | Name | Date |
| --- | --- | --- |
| 1,119,324 | Sprater | Dec. 1, 1914 |
| 1,500,685 | Roberts | July 8, 1924 |
| 1,537,962 | O'Neill | May 19, 1925 |
| 1,742,946 | Bertram | Jan. 7, 1930 |
| 1,746,913 | Stenhouse | Feb. 11, 1930 |
| 2,246,461 | Cannon | June 17, 1949 |

Dedication 2,685,765.—*Frederick A. Dahlman* and *Donald J. Tingley*, Corning, N.Y. GLASS FEEDER PLUNGER-OPERATING MECHANISM. Patent dated Aug. 10, 1954. Dedication filed Sept. 6, 1962, by the assignee, *Corning Glass Works*.

Hereby dedicates to the public of the United States the full term of said patent.

[*Official Gazette October 16, 1962.*]